Patented June 28, 1927.

1,634,241

UNITED STATES PATENT OFFICE.

CHARLES N. FORREST, OF RAHWAY, NEW JERSEY, ASSIGNOR TO THE BARBER ASPHALT COMPANY, OF PHILADELPHIA, PENNSYLVANIA, A CORPORATION OF WEST VIRGINIA.

ASPHALTIC-PAVING COMPOSITION.

No Drawing. Application filed April 22, 1925. Serial No. 25,133.

My invention relates to a novel asphaltic paving composition to be used in the manufacture or repair of asphaltic paving, and particularly as a wearing surface for asphalt streets or roads.

The object of my invention is to make the known asphalt paving compositions more tough and stable than has heretofore been possible, without diminution of the binding qualities of the asphalt, whereby the composition may the better withstand the effects of traffic without rutting, waving or other displacement.

I attain this object by intimately combining with the asphalt a salt of acetic acid which is fusible at the temperatures used for refining or fluxing the asphalt or for mixing it with its aggregate.

Attempts have been made to improve the stability of asphaltic compositions by adding thereto certain salts, such as copper sulphate, zinc chloride, etc., but these salts are not fusible at the temperatures used in the treatment of asphaltic compositions, and consequently even though finely powdered do not become sufficiently diffused in the asphalt composition to well accomplish the desired result.

I have discovered, however, that the result desired is accomplished by using for this purpose a salt of acetic acid, such for example as sodium acetate, which is fusible, and, therefore, diffusible throughout the composition, by reason of the fact that its melting point is within the range of temperatures to which asphalt is and may safely be subjected in the process of refining or fluxing it, or of combining it with its aggregate.

The temperatures ordinarily used in the manufacture of asphalt paving cements run from 300 to 450° F. The melting point of sodium acetate is approximately 136° F., so that this salt is very suitable for the purpose.

In the practice of my invention I have found that the addition to the asphalt of from 1 to 5% by weight of sodium acetate exerts a beneficial stabilizing and toughening effect upon the asphalt causing a considerable change in its softening point and decreasing its plasticity.

The sodium acetate may be added directly to the melted asphalt cement, or to the combined melted asphalt cement and hot mineral aggregate during the mixing of the paving mixture in the customary manner. In either event, the acetate melts and is thus brought into intimate contact with the liquid bitumen, water and other volatile constituents are expelled, and the anhydrous sodium acetate remains in the asphalt or mixture with the beneficial effects described. The mixing operation is completed in the course of one to two minutes.

On account of the reduction in plasticity of the asphalt cement by this treatment, the entire paving mixture is so toughened and stabilized that it sustains traffic without marking or displacement, while the same asphalt and mineral aggregate employed without this type of chemical treatment is inferior in these respects.

The sodium acetate may be added to any of the customarily used asphaltic paving cements, and with the cement thus stabilized and toughened may be combined any of the customarily used mineral aggregates. For the sake of example, however, I will indicate typical proportionments which may be used for both a sand and stone aggregate.

*Sand.*

|  | Pounds. |
|---|---|
| Asphalt cement | 9–18 |
| Sodium acetate | 0.27–0.54 |
| Stone dust | 9–20 |
| Graded sand 100 to 8 mesh | 81.73–61.46 |

*Stone.*

|  | Pounds. |
|---|---|
| Asphalt cement | 5–10 |
| Sodium acetate | 0.15–0.30 |
| Stone dust | 5–15 |
| Graded stone 100 mesh to 1 inch | 89.85–74.70 |

Having thus described my invention, I claim:

1. An asphaltic paving mixture the asphalt cement of which has combined with it a small percentage of an acetate salt fusible at the temperatures employed in the manufacture of said asphalt cement, whereby the paving mixture is toughened and stabilized.

2. As asphaltic paving mixture as recited in claim 1, the fusible salt being sodium acetate.

In testimony whereof, I have hereunto signed my name at Philadelphia, Pennsylvania, this 20th day of April, 1925.

CHARLES N. FORREST.